US005444596A

United States Patent [19]

Tanaka et al.

[11] Patent Number: 5,444,596

[45] Date of Patent: Aug. 22, 1995

[54] SURGE ABSORBER

[75] Inventors: Yoshiyuki Tanaka; Masatoshi Abe; Taka-aki Ito, all of Saitama, Japan

[73] Assignee: Mitsubishi Materials Corporation, Tokyo, Japan

[21] Appl. No.: 38,019

[22] Filed: Mar. 29, 1993

[30] Foreign Application Priority Data

Mar. 31, 1992 [JP] Japan .................................. 4-106058

[51] Int. Cl.$^6$ .................................................. H02H 3/22

[52] U.S. Cl. .................................... 361/120; 361/129; 361/130; 313/581; 313/631

[58] Field of Search ........................ 361/120, 129, 130; 313/581, 595, 631, 235, 355

[56] References Cited

U.S. PATENT DOCUMENTS 4,317,155 2/1982 Harada et al. ...................... 371/120

FOREIGN PATENT DOCUMENTS 4192279 4/1992 Japan .

*Primary Examiner*—Todd Deboer

*Attorney, Agent, or Firm*—Christopher R. Pastel; Peter J. Gluck; Thomas R. Morrison

[57] ABSTRACT

A discharge relay electrode is located between terminal electrodes of a gap-type surge absorber. In a microgap embodiment of the invention, a conducting film on a surface of an insulating tube is split by two circumferential gaps spaced apart longitudinally. The discharge relay electrode is positioned between the two gaps. In a gap type surge absorber, the discharge relay electrode is positioned within the insulating tube midway between the end electrodes, substantially filling the cross section of the tube, and dividing the interior of the tube into a plurality of chambers. For both types of surge absorbers, the discharge relay electrode is effective to relay discharge between the terminal electrodes.

12 Claims, 5 Drawing Sheets

SURGE ABSORBER

BACKGROUND OF THE INVENTION

1. Field of the Invention

The present invention relates to a surge absorber used for protecting electronic components against abnormally high AC or DC voltage. More particularly, the present invention relates to a surge absorber using a plurality of gaps in series in a gap-type surge absorbing element.

2. Description of the Related Art

Gap-type surge absorbers are generally used for protecting electronic components connected to a circuit receiving a DC voltage, such as a cathode ray tube circuit (CRT). Abnormally high voltages, which are harmful to electronic components, may be created by static electricity or lightning surges. Gap-type surge absorbers, having a microgap-type discharge tube or a gap-type discharge tube, are conventionally used to protect the electronic components by controlling these abnormal voltages.

Referring to FIG. 7, a surge absorber of the prior art employs a microgap-type discharge tube 10 having a surge absorbing element sealed within an insulating tube 21. The surge absorbing element includes a columnar ceramic body 12 covered with a conductive film 11. Micro gaps 13 and 14 are formed about the circumference of columnar ceramic body 12 spaced apart in the longitudinal direction of columnar ceramic body. Cap electrodes 16 and 17, serving as terminal electrodes, are attached at the opposed ends of ceramic body 12. Lead wires 18 and 19 are connected to cap electrodes 16 and 17, respectively. An insulating tube 21 surrounding ceramic body 12 and cap electrodes 16 and 17 is filled with an inert gas. Lead wires 18 and 19 extend from cap electrodes 16 and 17 to permit connection to external circuits. As shown in the figures, the openings through which lead wires 18 and 19 pass are sealed using any suitable technique such as, for example, soldering.

Referring to FIG. 8, another surge absorber of the prior art employs a gap-type discharge tube 30 that has sealing terminal electrodes 31 and 32 at opposed ends thereof. Electrodes 31 and 32 seal an inert gas within an insulating tube 33. The region in insulating tube 33, filled with inert gas, between terminal electrodes 31 and 32, provides a discharge gap 34 to permit discharges to occur in the presence of excessive voltage applied to terminal electrodes 31 and 32.

Referring to FIG. 5, microgap-type discharge tube 10 or gap-type discharge tube 30 may be connected to a circuit as shown. A power source circuit 2 is composed of power source 6 of voltage $V_0$, a resistor 7 of resistance R, and either a microgap-type discharge tube 10 or a gap-type discharge tube 30. Output terminals 3 and 4 of power source circuit 2 feed DC power to a using circuit such as, for example, a CRT 1.

Referring to FIG. 6, current-voltage characteristics of gap discharge tubes 10 and 30 are generally divided into a glow-discharge region and an arc-discharge region. In the glow-discharge region, a relatively low current flows through discharge tube 10/30. In the arc-discharge region, a relatively large current flows through gap discharge tube 10/30. The arc discharge is initiated by the application of an AC or DC voltage across terminal electrodes 16 and 17 that produces a current that exceeds the current in the glow-discharge region for microgap-type discharge tube 10, or terminal electrodes 31 and 32 for gap-type discharge tube 30. Current-voltage characteristics between output terminals 3 and 4 of power source circuit 2 change as indicated by the solid line A in FIG. 6.

If the resistance value R of resistor 7 is reduced in an attempt to increase output current of power source circuit 2, holdover current (follow current) occurs at a point H on the low-resistance broken line B in FIG. 6. Holdover current is characterized by the continuation of discharge even after the applied voltage is reduced below the striking voltage. In order to prevent holdover current, it is conventional to reduce the output current of power source circuit 2 by increasing the value of resistance R as indicated by the one-point dash line C in FIG. 6, or by increasing the voltage level required to maintain the glow discharge as indicated by the two-point dash line D in FIG. 6.

In conventional circuits, holdover current results in ionization of the inert gas which remains in the device, and effectively provides a conduction path past the gap or gaps. The ionized gas provides a relatively low-resistance conduction path for the current such that the current can be maintained by a lower voltage than the original striking voltage. In an AC power supply, the ionized gas is capable of permitting resumption of conduction even after conduction is extinguished by the voltage passing through zero. In a gap-type surge absorber of the conventional construction, however, a change in glow discharge voltage causes a change in discharge starting, or striking, voltage, thus leading to inconveniences such as deterioration of the surge absorbing property and a corresponding deterioration in the protection provided to the electronic circuit. Consequently, it has been conventional to prevent holdover current by increasing the value of resistance R, thereby reducing the output current of power source circuit 2.

OBJECTS AND SUMMARY OF THE INVENTION

Accordingly, it is an object of the present invention to provide a surge absorber which overcomes the drawbacks of the prior art.

It is a further object of the present invention to provide a surge absorber which permits an increase in discharge, keeping the voltage within a glow discharge range, without changing the discharge starting voltage.

It is a still further object of the present invention to provide a gap-type surge absorber in which holdover current is prevented even when a relatively large current is fed to a circuit receiving an AC or a DC voltage.

Briefly stated, the present invention provides a gap-type surge absorber having a discharge relay electrode located between terminal electrodes of a gap-type surge absorber. In a microgap embodiment of the invention, a conducting film on a surface of an insulating tube is split by two circumferential gaps spaced apart longitudinally. The discharge relay electrode is positioned between the two gaps. In a gap type surge absorber, the discharge relay electrode is positioned within the an insulating tube midway between the end electrodes, substantially filling the cross section of the tube, and dividing the interior of the tube into a plurality of chambers. For both types of surge absorbers, the discharge relay electrode is effective to relay discharge between the terminal electrodes.

To achieve the above-mentioned objects, the gap-type surge absorber of the present invention comprises a pair of terminal electrodes, at least one gap provided between these terminal electrodes, an insulating tube which encloses the gap or gaps and seals an inert gas therein, and a discharge relay electrode which is provided in the gap or between the gaps. The discharge relay electrode relays discharges between the terminal electrodes.

In one embodiment of the present invention, the gap-type surge absorber additionally comprises a gap-type surge absorbing element in the insulating tube. The discharge relay electrode, located between two gaps, is adjacent to a circumferential surface of the surge absorbing element.

In another embodiment of the present invention, the terminal electrodes of the gap-type surge absorber close and seal opposing ends of the insulating tube, thereby retaining the discharge relay electrode and the inert gas in the insulating tube. Also, the discharge relay electrode divides the inner space of the insulating tube into a plurality of chambers.

In still another embodiment of the present invention, the gap-type surge absorber comprises a plurality of discharge relay electrodes wherein the plurality of discharge relay electrodes relay discharges between the terminal electrodes.

According to an embodiment of the invention, there is provided a surge absorber comprising: an insulating tube, an inert gas sealed within said insulating tube, a gap-type surge absorbing element in said insulating tube, said surge absorbing element including means for applying a voltage to opposed ends thereof, a plurality of gaps in said surge absorbing element, a discharge relay electrode adjacent to a circumferential surface of said surge absorbing element and located between two of said gaps, and said discharge relay electrode including means for relaying discharge between said first and second ends.

According to a feature of the invention, there is provided a surge absorber comprising: an insulating tube, an inert gas in said insulating tube, at least one discharge relay electrode in said insulating tube, first and second terminal electrodes closing and sealing opposed ends of said insulating tube and retaining said at least one discharge relay electrode and said inert gas in said insulating tube, and said at least one discharge relay electrode being effective to divide an inner space of said insulating tube into at least first and second chambers and to relay discharge between said first and second terminal electrodes.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

First Embodiment

Figure 1:
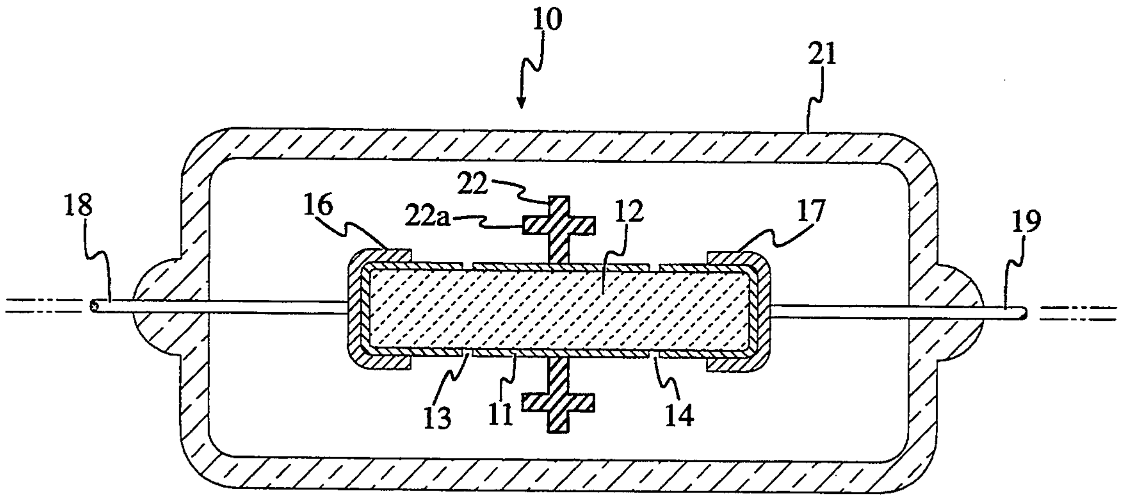
FIG. 1 is a sectional view of a surge absorber, according to an embodiment of the present invention, based on a microgap-type discharge tube.
Figure 2:
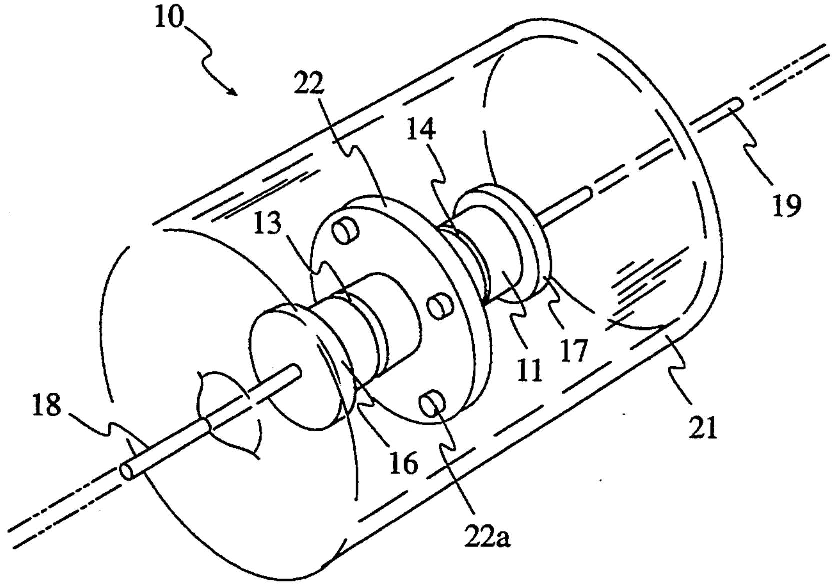
FIG. 2 is a perspective view of the surge absorber shown in FIG. 1.

Referring now to FIGS. 1 and 2, there is shown, generally at 10, a first embodiment of a gap-type surge absorber, in accordance with the invention. The gap-type surge absorber is a microgap-type discharge tube 10 with a discharge starting voltage of, for example, 500 V. Discharge tube 10 includes a columnar ceramic body 12 covered with a conductive film 11 on its outer surface. Cap electrodes 16 and 17 are affixed over the ends of ceramic body 12. A glass tube 21 encloses and seals all of the components. Lead wires 18 and 19 are attached to cap electrodes 16 and 17, respectively, and pass sealingly through the ends of glass tube 21 for connection to an external circuit. First and second micro gaps 13 and 14 divide conductive film 11 into three parts. Micro gaps 13 and 14 are spaced apart at set intervals longitudinally on the circumferential surface of ceramic body 12. The widths of micro gaps 13 and 14 influence the striking voltage. In one embodiment of the invention, micro gaps 13 and 14 have widths of several tens of μm.

A ring-shaped discharge relay electrode 22 encircles the center of ceramic body 12. Discharge relay electrode 22 is made of a suitable conductor such as, for example, copper, iron-nickel alloys, iron-nickel-chromium alloys, or iron-nickel-cobalt alloys. Discharge relay electrode 22 has an inside diameter large enough to fit around the outer surface of ceramic body 12 and an outside diameter smaller than the inside diameter of glass tube 21. Discharge projections *22a* are provided, in close proximity to the circumferential surface of ceramic body 12, on the opposite sides of discharge relay electrode 22.

Gap discharge tube 10 is prepared by the following method.

First, lead wires 18 and 19 are welded to the outer surfaces of cap electrodes 16 and 17, respectively. Next, discharge relay electrode 22 is pressed into place in the longitudinal center of conductive film 11 on ceramic body 12. Then, cap electrodes 16 and 17 are pressed into place at the ends of ceramic body 12. Subsequently, micro gaps 13 and 14 are formed by laser-cutting conductive film 11 on the circumferential surface of ceramic body 12, one on either side of discharge relay electrode 22. Ceramic body 12, cap electrodes 16 and 17, and lead wires 18 and 19 are placed inside glass tube 21, which is then filled with an inert gas such as argon, and sealed.

When a high discharge starting voltage is required, the number of gaps may be increased in order to increase discharge starting voltage. It is possible to increase the discharge starting voltage and yet keep the voltage within the glow discharge characteristic by providing a discharge relay electrode between adjacent gaps.

When an abnormal voltage is applied to the gap-type surge absorber and a glow discharge of an initial discharge takes place between gaps 13 and 14, this glow discharge is divided by discharge relay electrode 22. In order to cause a discharge between terminal electrodes 16 and 17, terminal electrode 16 discharges to discharge relay electrode 22, and discharge relay electrode 22 discharges to terminal electrode 17. electrode 22 discharges to terminal. The plurality of combined discharge phenomena increases the discharge keeping voltage under glow discharge conditions, and increase the discharge voltage under arc discharge conditions as well.

In the prior art gap-type surge absorber, as described above, discharge triggered by gaps develops into discharge through the ionized gas directly between the pair of terminal electrodes. According to the present invention, in contrast, the discharge relay electrode between the pair of terminal electrodes divides the discharge between the terminal electrodes into a plurality of partial discharges through the discharge relay electrode, while preventing direct discharge between the terminal electrodes. It is thus possible to increase the discharge keeping voltage under glow discharge conditions without causing a variation of the discharge starting voltage. Consequently, it is possible to reduce the series resistance, to thereby feed to a circuit, without causing holdover current, a larger output current than is conventionally available.

Comparative Example 1

Figure 7:
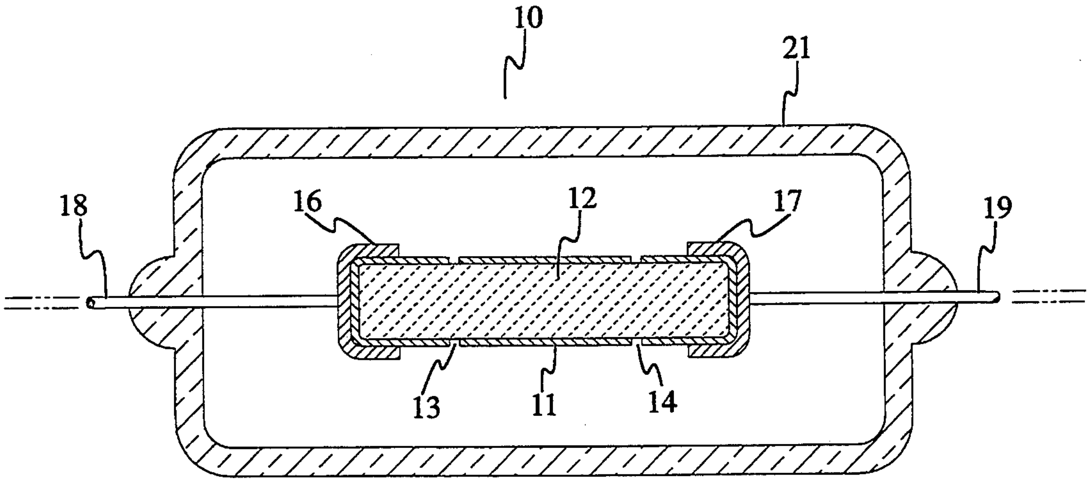
Fig. 7 prior art
FIG. 7 is a sectional view of a microgap-type discharge tube of the prior art.

A comparative example surge absorber (comparative example 1) was assembled according to the prior art embodiment shown in FIG. 7, comprising a microgap-type discharge tube with a discharge starting voltage of 500 V. Comparative example 1 had the same construction as the first embodiment except that discharge relay electrode 22 was omitted from comparative example 1.

Electrical characteristics of the first embodiment and comparative example 1 were investigated.

In response to an impulse artificial surge voltage of (1.2×50) μsec -5 kV, surge absorbers of both the first embodiment and comparative example 1 started discharge at a voltage of 1,000 V. Upon discharge, while the gap discharge tube of comparative example 1 showed a glow discharge keeping voltage of 160 V, the gap discharge tube of the first embodiment showed a glow discharge keeping voltage of 300 V. The subsequent arc discharge keeping voltage was 20 V for the gap discharge tube of comparative example 1, and 40 V for the gap discharge tube of the first embodiment.

Figure 5:
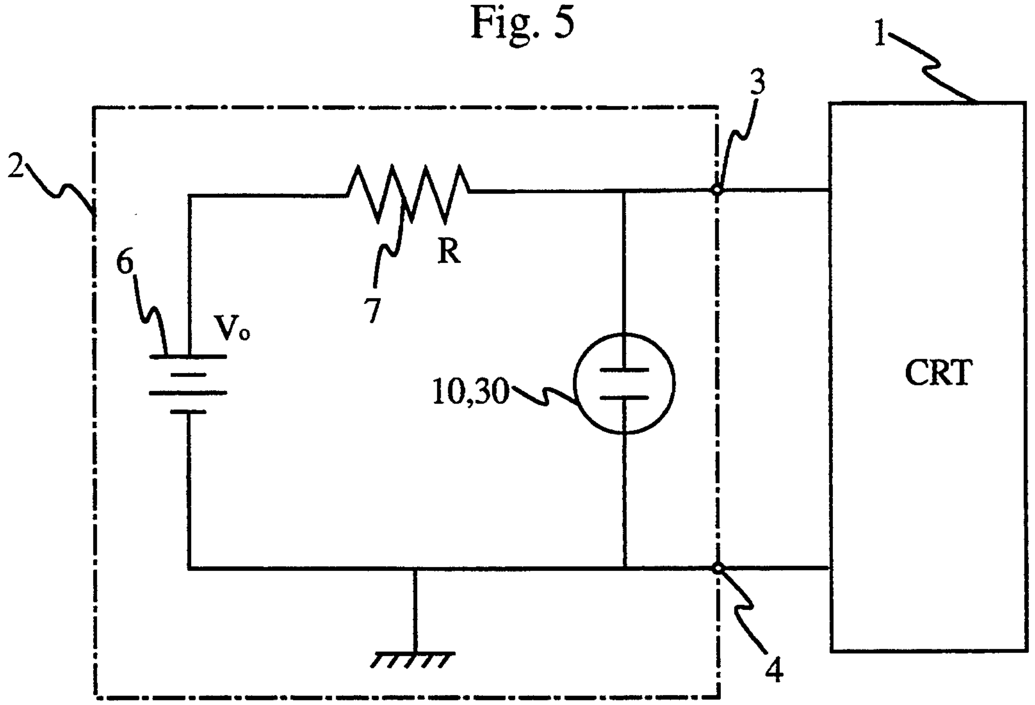
FIG. 5 is a circuit diagram illustrating a connection of the present invention to an outside circuit.
Figure 6:
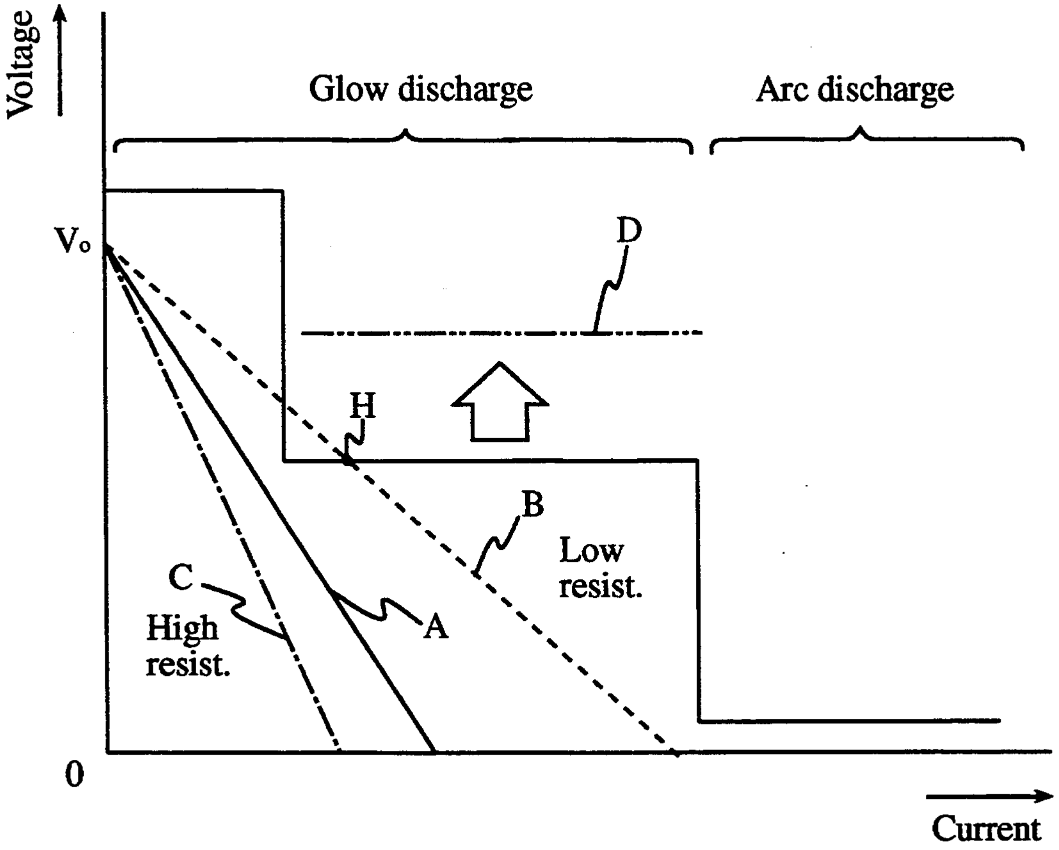
FIG. 6 is a current-voltage characteristic graph of the prior art and of the present invention.

Ten microgap-type discharge tubes each of the first embodiment and of comparative example 1 were prepared. The resistance value R of power source circuit 2, shown in FIG. 5, was set at 2.5 k ohms, and a gap discharge tube was connected to output terminals 3 and 4. The presence of holdover current was checked by applying a DC voltage high enough to produce a gas discharge, and reducing the voltage to a DC voltage $V_0$ of 250 V. Holdover current took place in all the ten gap discharge tubes of the comparative example 1, whereas holdover current did not occur in any of the ten gap discharge tubes of the first embodiment.

Second Embodiment

Figure 3:
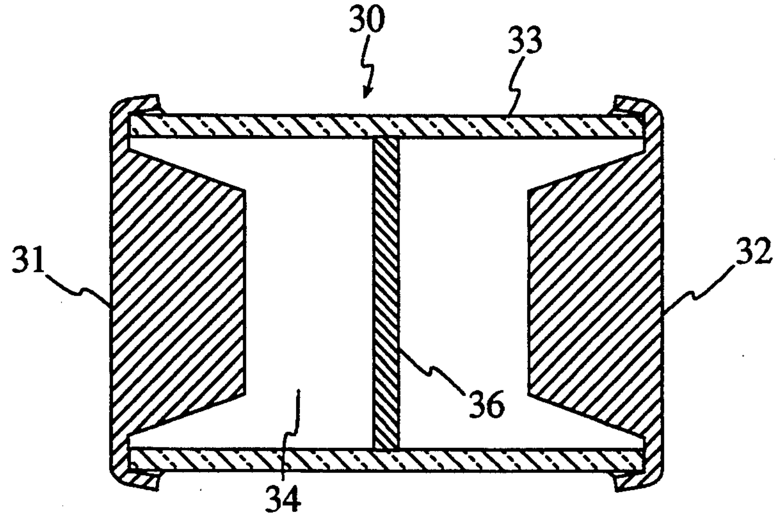
FIG. 3 is a sectional view of a surge absorber, according to a second embodiment of the present invention, based on a gap-type discharge tube.
Figure 4:
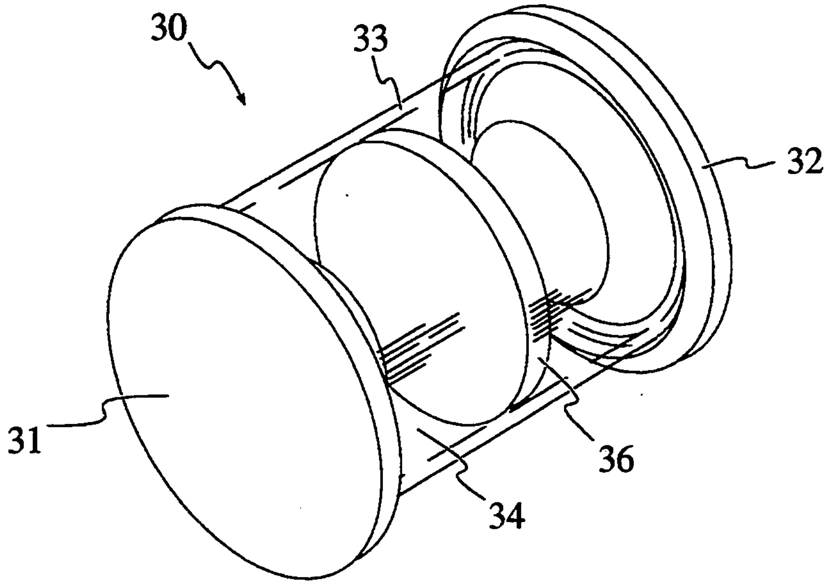
FIG. 4 is a perspective view of the surge absorber shown in FIG. 3.

Referring to the second embodiment shown in FIGS. 3 and 4, the gap-type surge absorber is a gap-type discharge tube 30 with a discharge starting voltage of 500 V. Gap-type discharge tube 30 comprises glass tube 33, sealing electrodes 31 and 32, and disk-shaped discharge relay electrode 36. Discharge relay electrode 36, of a suitable conductor such as, for example, copper, iron-nickel alloy, iron-nickel-chromium alloy, and iron-nickel cobalt alloy, is installed in the center of glass tube 33. The outer circumferential surface of discharge relay electrode 36 contacts the inner surface of glass tube 33 to divide gap 34 into two chambers.

Glass tube 33 containing discharge relay electrode 36 is filled with an inert gas such as argon, the pressure is adjusted to provide a desired discharge starting voltage of, for example, 500 VDC and the ends are sealed airtight with electrodes 31 and 32.

Comparative Example 2

Figure 8:
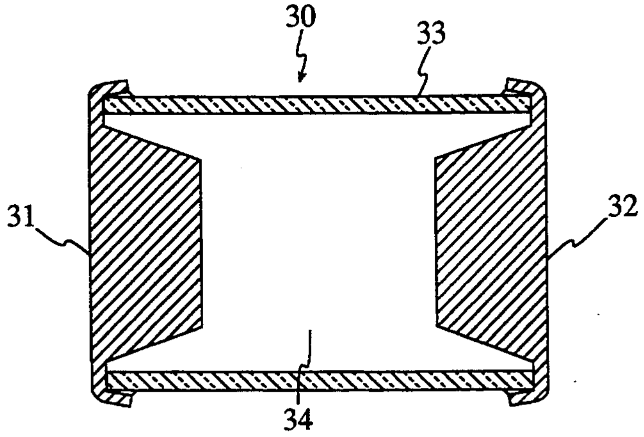
Fig. 8 prior art
FIG. 8 is a sectional view of a gap-type discharge tube of the prior art.

A comparative example surge absorber (comparative example 2) was assembled according to the prior art embodiment shown in FIG. 8, comprising a gap-type discharge tube with a discharge starting voltage of 500 V. Comparative example 2 had the same construction as the second embodiment except that discharge relay electrode 36 was omitted from comparative example 2.

Electrical characteristics of the second embodiment and comparative example 2 were investigated.

In response to an artificial surge impulse voltage of (1.2×50) μsec -5 kV, the surge absorbers of both the second embodiment and comparative example 2 started discharge at a voltage of 1500 V. Upon discharge, while the gap discharge tube of the comparative example 2 showed a glow discharge keeping voltage of 150 V, the gap discharge tube of the second embodiment showed a glow discharge keeping voltage of 300 V. The subsequent arc discharge keeping voltage was 20 V for the gap discharge tube of comparative example 2, and 40 V for the gap discharge tube of the second embodiment.

Ten gap-type discharge tubes each of the second embodiment and of comparative example 2 were prepared. The resistance value R of power source circuit 2 shown in FIG. 5 was set at 2.5 k ohms, and gap discharge tube 33 was connected to output terminals 3 and 4. The presence of holdover current was checked by following a discharge with a DC voltage $V_0$ of 250 V. Holdover current took place in all ten gap discharge tubes of comparative example 2, whereas holdover current did not occur in any of the ten gap discharge tubes of the second embodiment.

The use of the gap-type surge absorber of the present invention is not necessarily at a position having a DC power source.

Third Embodiment

While the first embodiment is comprised of two micro gaps, three or more micro gaps may also be used in the present invention. In such a case, the number of discharge relay electrodes may also be increased in order to achieve a similar or improved result.

Figure 9:
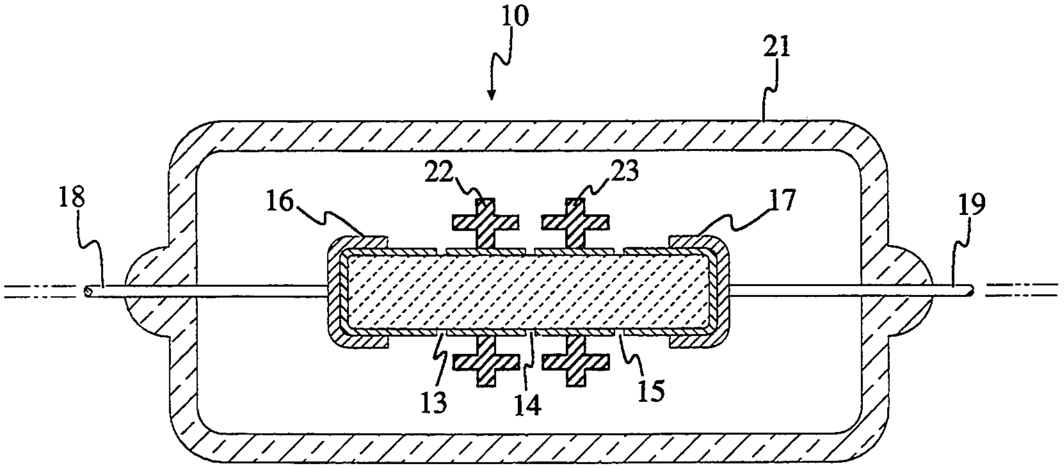
FIG. 9 is a sectional view of a surge absorber, according to a third embodiment of the present invention, based on a microgap-type discharge tube.

Referring to the third embodiment shown in FIG. 9, the gap-type surge absorber is a microgap-type discharge tube with a discharge starting voltage of 1,000 V, and is similar to the first embodiment, except that the surge absorber has two discharge relay electrodes 22 and 23, and three micro gaps 13, 14, and 15.

Comparative Example 3

A comparative example surge absorber (comparative example 3) was assembled according to the prior art embodiment shown in FIG. 7, having a discharge starting voltage of 1000 V.

Electrical characteristics were investigated for the third embodiment and comparative example 3.

In response to an artificial surge impulse voltage of (1.2×50) μsec -5 kV, the surge absorbers of both the third embodiment and comparative example 3 started discharge at a voltage of 1,500 V. Upon discharge, while the gap discharge tube of the comparative example 3 showed a glow discharge keeping voltage of 160 V, the gap discharge tube of the third embodiment showed a glow discharge keeping voltage of 500 V. The subsequent arc discharge voltage was 20 V for the gap discharge tube of comparative example 3, and 60 V for the gap discharge tube of the third embodiment.

Ten microgap-type discharge tubes each of the third embodiment and of comparative example 3 were prepared. The resistance value R of power source circuit 2 shown in FIG. 5 was set at 4 k ohms, and a gap discharge tube was connected to output terminals 3 and 4. The presence of holdover current was checked for by following a discharge with a DC voltage $V_0$ of 500 V. Holdover current took place in all ten gap discharge tubes of comparative example 3, whereas holdover current did not occur in any of the ten gap discharge tubes of the third embodiment.

These results permitted confirmation of the possibility of building the surge absorber of the present invention, which increases the discharge keeping voltage upon glow discharge, without causing a variation of the discharge starting voltage. Consequently, the occurrence of holdover current is avoided even when feeding relatively large current to a circuit receiving a high DC voltage, such as a CRT.

The gap-type surge absorber of the present invention may be used with either AC or DC power sources.

The insulating tube is not limited to a glass tube, but may be a ceramic tube.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A surge absorber comprising:
- an insulating tube;
- an inert gas sealed within said insulating tube;
- a gap-type surge absorbing element in said insulating tube;
- said surge absorbing element including means for applying a voltage to opposite ends thereof:
- a plurality of gaps in said surge absorbing element;
- a discharge relay electrode extending radially outward from a circumferential surface of said surge absorbing element and located between two of said plurality of gaps; and
- said discharge relay electrode relaying discharge between said first and second ends.

2. A surge absorber according to claim 1, wherein said means for applying includes:
- first and second terminal electrodes;
- first and second terminal leads connected to said first and second terminal electrodes; and
- means for leading said first and second terminal leads outside said insulating tube.

3. A surge absorber according to claim 1, wherein:
- said gap-type surge absorbing element is a microgap-type discharge tube;
- said gap-type surge absorbing element includes a columnar ceramic body;
- a conductive film on a circumferential body surface of said columnar ceramic body; and
- said conductive film having said gaps therein forming microgaps.

4. A surge absorber according to claim 1, wherein said discharge relay electrode includes at least first and second discharge projections extending axially on opposing sides of said discharge relay electrode, and said first and second discharge electrodes being located circumferentially equidistant from a surface of said insulating tube.

5. A surge absorber according to claim 1, wherein said insulating tube is made of a material selected from the group consisting of glass and ceramic.

6. A surge absorber according to claim 1, wherein said discharge relay electrode is made of a material selected from the group consisting of copper, iron-nickel alloys, iron-nickel-chromium alloys, and iron-nickel-cobalt alloys.

7. A surge absorber according to claim 1, further comprising:
- at least one additional discharge relay electrode;
- said at least one additional discharge relay electrode being located adjacent to said circumferential surface of said surge absorbing element and between two of said gaps; and
- said at least one additional discharge relay electrode being effective to relay an electrical discharge between said first and second ends.

8. A surge absorber comprising:
- an insulating tube;
- first and second electrodes in said tube;
- means for permitting application of a voltage to said first and second electrodes;
- means for permitting a gap discharge to occur in said tube; and
- at least one discharge relay electrode in said tube extending radially outward in said tube; and
- said at least one discharge relay electrode including means for forcing said gap discharge to occur separately between itself and said first and second electrodes, whereby a voltage inducing a follow current is substantially increased.

9. A surge absorber comprising:
- an insulating tube;
- first and second electrodes in said tube;
- means for permitting application of a voltage to said first and second electrodes;
- means for permitting a gap discharge to occur in said tube; and
- at least one discharge relay electrode in said tube; and
- said at least one discharge relay electrode including means for forcing said gap discharge to occur separately between itself and said first and second electrodes, whereby a voltage inducing a follow current is substantially increased;
- said means for forcing includes said discharge relay electrode filling a substantial part of a cross section of said insulating tube.

10. A surge absorber according to claim 9, wherein said discharge relay electrode fills said cross section substantially completely.

11. A surge absorber comprising:
- an insulating tube;

first and second electrodes in said tube;

means for permitting application of a voltage to said first and second electrodes;

means for permitting a gap discharge to occur in said tube; and at least one discharge relay electrode in said tube; and said at least one discharge relay electrode including means for forcing said gap discharge to occur separately between itself and said first and second electrodes, whereby a voltage inducing a follow current is substantially increased;

said means for permitting a gap discharge includes a conductive film including first and second gaps therein in series between said first and second electrodes; and said at least one discharge relay electrode is disposed between said first and second gaps.

12. A surge absorber according to claim 11, wherein:

said means for forcing a gap discharge includes at least first and second discharge projections;

said first discharge projection is disposed on a first surface of said discharge relay electrode;

said first discharge portion protrudes in an axial direction toward said first electrode;

said second discharge projection is disposed on a second surface of said discharge relay electrode opposite said first surface; and said second discharge projection protrudes in said axial direction toward said second electrode.

* * * * *